(12) United States Patent
Boyce

(10) Patent No.: US 10,328,870 B2
(45) Date of Patent: Jun. 25, 2019

(54) WORK VEHICLE UPHOLSTERY MOUNTING SYSTEM

(71) Applicant: Deere & Company, Moline, IL (US)

(72) Inventor: Dean A. Boyce, Waterloo, IA (US)

(73) Assignee: DEERE & COMPANY, Moline, IL (US)

( * ) Notice: Subject to any disclaimer, the term of this patent is extended or adjusted under 35 U.S.C. 154(b) by 13 days.

(21) Appl. No.: 15/219,078

(22) Filed: Jul. 25, 2016

(65) Prior Publication Data
US 2018/0022295 A1    Jan. 25, 2018

(51) Int. Cl.
| B60R 13/02 | (2006.01) |
| F16B 5/06 | (2006.01) |
| B60N 2/72 | (2006.01) |
| B60N 2/38 | (2006.01) |
| B60N 2/58 | (2006.01) |

(52) U.S. Cl.
CPC ............ *B60R 13/0206* (2013.01); *B60N 2/38* (2013.01); *B60N 2/72* (2013.01); *B60R 13/0212* (2013.01); *B60R 13/0237* (2013.01); *F16B 5/0664* (2013.01); *B60N 2/5825* (2013.01)

(58) Field of Classification Search
CPC . B60R 13/0206; B60R 13/01; B60R 13/0243; B60R 13/02; B60R 2013/0287; B60R 21/04; B60R 11/00; B60R 13/0212; B60R 13/0237; B60N 2/5825; B60N 2/5883; B60N 2/4686; B60N 2/6027; B60N 2/609; B60N 2/72; F16B 5/0664
USPC .... 248/71, 73, 222.11; 296/1.08, 39.1, 39.2, 296/901.01; 297/218.1, 218.2, 218.3, 297/218.4, 228.13, 452.59; 292/227; 411/45, 508; 24/297, 298, 458, 295
See application file for complete search history.

(56) References Cited

U.S. PATENT DOCUMENTS

| 1,675,998 A | * | 7/1928 | Walters ............... B60R 13/0206 16/4 |
| 2,040,365 A | * | 5/1936 | Diehl ...................... B60R 13/02 156/211 |
| 2,099,649 A | * | 11/1937 | Hall .................... B60R 13/0206 296/214 |

(Continued)

OTHER PUBLICATIONS

German Search Report dated Feb. 23, 2018 regarding Application No. 10 2017 210 471.6.

*Primary Examiner* — Jonathan Liu
*Assistant Examiner* — Taylor L Morris
(74) *Attorney, Agent, or Firm* — Klintworth & Rozenblat IP LLP

(57) ABSTRACT

An upholstery mounting system includes a support structure and a covering member. The system also includes a bracket that is fixed to the support structure. The bracket is flexible to move between a first position and a second position relative to the support structure. Also, the upholstery mounting system includes a boss that is fixed to the covering member. The boss, in a detached position is outside an opening of the bracket. The boss, in an attached position, is received in the opening and is removably attached to the bracket to attach the covering member to the support structure with the covering member extending over and covering at least part of the support structure. The boss is configured to flex the bracket between the first position and the second position as the boss moves from the detached position to the attached position.

19 Claims, 9 Drawing Sheets

(56) References Cited

U.S. PATENT DOCUMENTS

| | | | | |
|---|---|---|---|---|
| 2,974,383 | A * | 3/1961 | Bright | A47G 27/045 24/294 |
| 4,122,583 | A | 10/1978 | Grittner et al. | |
| 4,189,880 | A * | 2/1980 | Ballin | E06B 3/285 160/380 |
| 4,270,328 | A * | 6/1981 | Page | B60R 13/0206 24/292 |
| 4,296,530 | A * | 10/1981 | Muller | F16B 5/125 24/295 |
| 4,683,622 | A * | 8/1987 | Oehlke | F16B 5/0657 24/295 |
| 4,715,651 | A * | 12/1987 | Wakamatsu | B60N 2/5825 297/218.1 |
| 4,924,561 | A * | 5/1990 | Yoneyama | F16B 5/0642 24/297 |
| 5,000,507 | A * | 3/1991 | Baxter | B60R 13/01 296/104 |
| 5,015,034 | A * | 5/1991 | Kindig | A47C 7/70 160/380 |
| 5,046,775 | A * | 9/1991 | Marcum, Jr. | B60R 13/01 24/297 |
| 5,076,033 | A * | 12/1991 | Patsy, Jr. | E04H 15/58 160/392 |
| 5,111,619 | A * | 5/1992 | Billin | B60R 13/0206 24/297 |
| 5,121,963 | A * | 6/1992 | Kwasnik | B60N 2/4686 160/380 |
| 5,230,377 | A * | 7/1993 | Berman | E04B 9/303 160/327 |
| 5,347,690 | A * | 9/1994 | Mansoor | B60R 19/52 24/294 |
| 5,364,150 | A * | 11/1994 | Cochran | B60R 13/01 24/297 |
| 5,469,672 | A * | 11/1995 | Fisher | E04B 7/00 52/202 |
| 5,526,553 | A * | 6/1996 | Klein | F16B 2/248 24/289 |
| 5,540,476 | A * | 7/1996 | Cowsert | B60J 1/1815 160/392 |
| 5,577,779 | A * | 11/1996 | Dangel | E05C 19/06 220/326 |
| 5,598,611 | A * | 2/1997 | Yamada | F16B 21/088 24/295 |
| 5,639,140 | A * | 6/1997 | Labrash | B60R 11/0217 181/150 |
| 5,820,213 | A | 10/1998 | Severinski | |
| 5,879,051 | A * | 3/1999 | Cozzani | A47C 31/023 297/218.1 |
| 5,934,729 | A * | 8/1999 | Baack | B60R 13/0206 296/146.7 |
| 6,196,607 | B1 | 3/2001 | Gulisano | |
| 6,241,305 | B1 * | 6/2001 | Troeger | B60J 7/104 160/327 |
| 6,282,791 | B1 * | 9/2001 | Patelczyk | B29C 45/14 264/261 |
| 6,378,949 | B1 * | 4/2002 | Maeda | B60N 2/5825 297/452.56 |
| 6,543,843 | B1 * | 4/2003 | Moilanen | B60N 2/5825 297/218.3 |
| 6,708,462 | B2 * | 3/2004 | Pokorzynski | B29C 44/1257 296/146.7 |
| 6,813,865 | B2 * | 11/2004 | Peterson | B60R 13/0206 296/39.1 |
| 6,899,399 | B2 * | 5/2005 | Ali | B60N 2/5825 297/452.6 |
| 7,360,964 | B2 * | 4/2008 | Tsuya | B60R 13/0206 24/292 |
| 7,413,479 | B1 * | 8/2008 | Volpone | H01R 13/506 174/138 F |
| 7,461,436 | B2 * | 12/2008 | Asano | B60R 13/0206 24/297 |
| 7,475,934 | B2 * | 1/2009 | Sato | F16B 17/006 296/146.7 |
| 7,481,474 | B2 | 1/2009 | Higgins et al. | |
| 7,600,809 | B2 * | 10/2009 | Boggess | B60R 13/0206 24/289 |
| 7,717,458 | B2 * | 5/2010 | Tsuge | B60R 13/02 24/458 |
| 7,805,815 | B2 * | 10/2010 | Babian | B60R 13/0206 24/295 |
| 7,963,586 | B2 * | 6/2011 | Muller et al. | B29C 65/606 296/1.08 |
| 8,099,837 | B2 | 1/2012 | Santin et al. | |
| 8,112,849 | B2 * | 2/2012 | Lapouge | F16B 5/0692 24/462 |
| 8,157,324 | B2 * | 4/2012 | Matsuzaki | B60N 2/5816 297/218.1 |
| 8,297,676 | B2 * | 10/2012 | Osterhout | B60R 13/0206 280/728.2 |
| 8,303,010 | B2 * | 11/2012 | She | B60R 13/0206 296/1.08 |
| 8,322,001 | B2 * | 12/2012 | Ehrhardt | B60R 13/0206 24/289 |
| 8,469,438 | B2 * | 6/2013 | Mazur | B60R 13/0206 24/293 |
| 8,496,420 | B2 * | 7/2013 | Aoki | F16B 5/0642 411/45 |
| 8,517,442 | B1 * | 8/2013 | Agnew | B60R 13/0206 24/289 |
| 8,615,962 | B1 * | 12/2013 | Perez | B60R 13/0206 24/292 |
| 8,726,473 | B2 * | 5/2014 | Dole | B60R 13/0206 24/297 |
| 8,833,830 | B2 * | 9/2014 | Renke | B60R 13/0206 24/295 |
| 8,882,180 | B2 * | 11/2014 | van Oirschot | B60J 5/0458 180/289 |
| 8,911,022 | B2 * | 12/2014 | Pleskot | B60N 2/5825 297/218.3 |
| 8,943,655 | B2 * | 2/2015 | Kabeya | B60R 11/0217 24/453 |
| 8,998,310 | B2 * | 4/2015 | Lovasz | A47C 31/023 297/123 |
| 9,067,540 | B2 * | 6/2015 | Watanabe | B60R 7/06 |
| 9,618,026 | B2 * | 4/2017 | Morris | F16B 17/00 |
| 2002/0056175 | A1 * | 5/2002 | Magarino | B60R 13/0206 24/289 |
| 2005/0145410 | A1 * | 7/2005 | Daito | B60R 16/0215 174/72 A |
| 2008/0007080 | A1 * | 1/2008 | Maki | F16B 5/0614 296/29 |
| 2009/0089982 | A1 | 4/2009 | Higgins et al. | |
| 2010/0072804 | A1 * | 3/2010 | Stauske | B60N 2/5621 297/452.38 |
| 2012/0187707 | A1 * | 7/2012 | Kwolek | B60R 13/0206 296/1.08 |
| 2013/0183089 | A1 * | 7/2013 | Podsadny | B60R 13/0206 403/376 |
| 2013/0234463 | A1 * | 9/2013 | Vasko | B60R 7/04 296/1.08 |
| 2014/0062115 | A1 * | 3/2014 | Tuomisto | B60R 13/0206 296/1.08 |
| 2014/0132023 | A1 * | 5/2014 | Watanabe | B60R 13/0206 296/37.12 |
| 2015/0143673 | A1 * | 5/2015 | Biadatz | B60R 13/0206 24/289 |
| 2016/0129854 | A1 * | 5/2016 | Bachelder | B60R 13/0206 24/292 |
| 2016/0200265 | A1 * | 7/2016 | Polovich | B60R 13/04 24/292 |
| 2016/0236592 | A1 * | 8/2016 | Peniche | B60N 2/0725 |

* cited by examiner

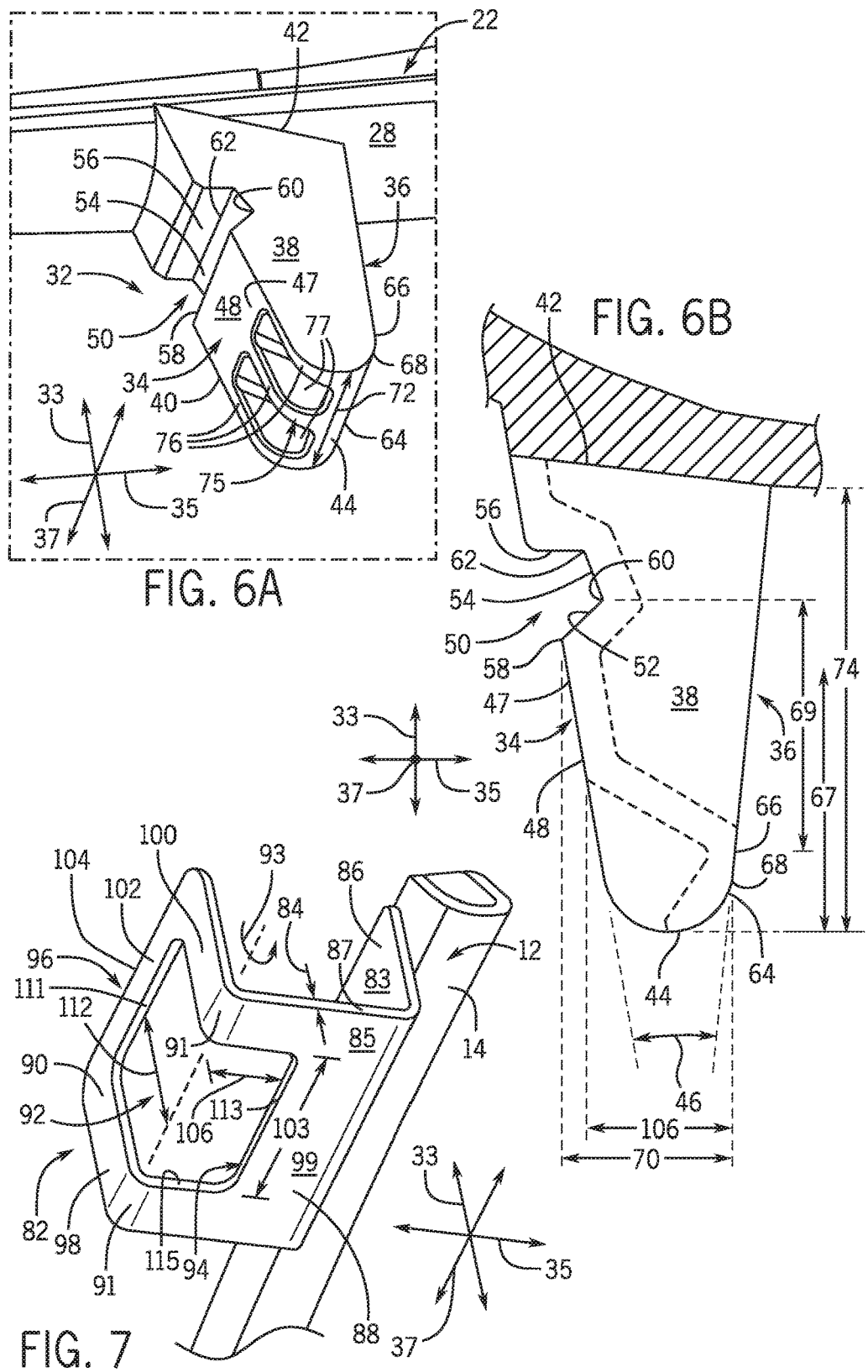

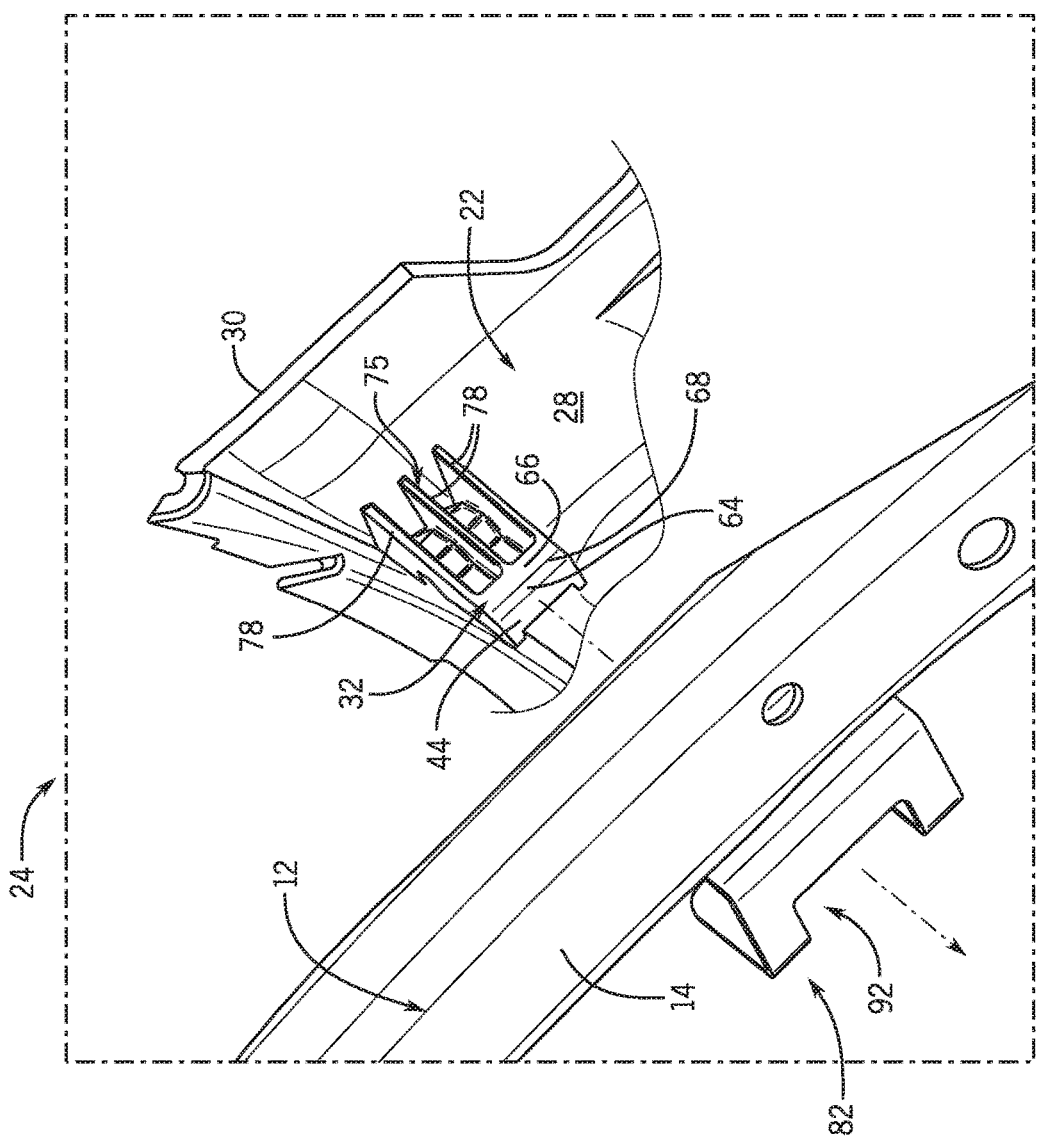

WORK VEHICLE UPHOLSTERY MOUNTING SYSTEM

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to an upholstery mounting system and, more particularly to an upholstery mounting system with flexible brackets.

BACKGROUND OF THE DISCLOSURE

Vehicles of many types, such as various work vehicles in the agriculture, construction and forestry industries, include upholstery, especially in the operator compartment or cabin. The upholstery may be of various types, such as seat covers, trim, wall and ceiling covering, or other sheet-like coverings. The upholstery may be used for operator comfort, aesthetics, or other purposes.

Usually, the upholstery is attached to the frame or other support structure of the vehicle. For example, the upholstery may extend over and attach to various frame/support structures to cover over and hide those frame/support structures.

SUMMARY OF THE DISCLOSURE

This disclosure provides an upholstery mounting system for attaching a covering member to a support structure.

In one aspect the disclosure provides an upholstery mounting system with a support structure and a covering member. The upholstery mounting system also includes a bracket that is fixed to the support structure. The bracket includes an opening. The bracket is flexible to move between a first position and a second position relative to the support structure. Also, the upholstery mounting system includes a boss that is fixed to the covering member. The boss has a detached position and an attached position relative to the bracket. The boss, in the detached position is outside the opening. The boss, in the attached position, is received in the opening and is removably attached to the bracket to attach the covering member to the support structure with the covering member extending over and covering at least part of the support structure. The boss is configured to flex the bracket between the first position and the second position as the boss moves from the detached position to the attached position.

In another aspect, the disclosure provides an upholstery mounting system that includes a support structure and a covering member. The upholstery mounting system also includes a bracket that is fixed to the support structure. The bracket includes an opening. The bracket includes a first portion and a second portion that are disposed on opposite sides of the opening. The upholstery mounting system further includes a boss that is fixed to the covering member. The boss has a first face and a second face that opposes the first face. The boss has a detached position and an attached position relative to the bracket. The boss, in the detached position, is outside the opening and spaced apart from the bracket. The boss, in the attached position, is received in the opening and removably attached to the bracket to attach the covering member to the support structure with the covering member extending over and covering at least part of the support structure. The first face abuts the first portion of the bracket and the second face abuts the second portion of the bracket and resiliently flexes the first portion away from the second portion when the boss is in the attached position.

The details of one or more embodiments are set forth in the accompanying drawings and the description below. Other features and advantages will become apparent from the description, the drawings, and the claims.

BRIEF DESCRIPTION OF THE DRAWINGS

FIG. 6A is a perspective view of a boss of the upholstery mounting system according to example embodiments of the present disclosure;

FIG. 6B is a side view of the boss of FIG. 6A;

FIG. 7 is a perspective view of a bracket of the upholstery mounting system according to example embodiments of the present disclosure;

FIG. 8A is a perspective view of the upholstery mounting system, wherein the boss is detached and shown moving toward the bracket;

Like reference symbols in the various drawings indicate like elements.

DETAILED DESCRIPTION

Figure 1:
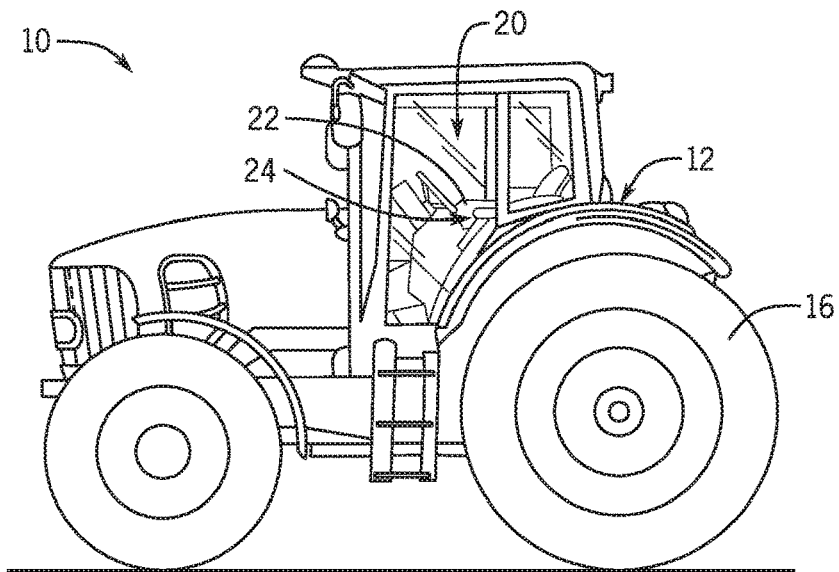
FIG. 1 is a side view of an example work vehicle in the form of an agricultural tractor with an upholstery mounting system of the present disclosure.

The following describes one or more example embodiments of an upholstery mounting system for a vehicle, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction, such as "forward," "aft," "lateral," "horizontal," and "vertical" may be used. Such terms are defined, at least in part, with respect to the direction in which the work vehicle or implement travels during use. The term "forward" and the abbreviated term "fore" (and any derivatives and variations) refer to a direction corresponding to the direction of travel of the work vehicle, while the term "aft" (and derivatives and variations) refer to an opposing direction. The term "fore-aft axis" may also reference an axis extending in fore and aft directions. By comparison, the term "lateral axis" may refer to an axis that is perpendicular to the fore-aft axis and extends in a horizontal plane; that is, a plane containing both the fore-aft and lateral axes. The term "vertical," as appearing herein, refers to an axis or a direction orthogonal to the horizontal plane containing the fore-aft and lateral axes.

The following describes one or more example implementations of the disclosed upholstery mounting system as shown in the accompanying figures. The disclosed upholstery mounting system, its method of installation, and the methods of manufacturing provide a number of benefits as compared to conventional systems.

In some embodiments, the upholstery mounting system may include various features that facilitate installation, for example, into a vehicle. These features may also ensure secure attachment of the upholstery to a support structure of the vehicle. One or more of these features may be flexible and resilient. This flexibility and resiliency may bias parts toward an attached or interconnected position to facilitate installation of the upholstery. Additionally, the flexible and resilient members of the mounting system may pull the upholstery tight for improved "fit and feel" of the upholstery once installed. Furthermore, because of the flexible and resilient members, the mounting system may be formed according to relatively loose tolerances and, yet, the upholstery may be installed securely.

Moreover, in some embodiments, the upholstery mounting system may have a relatively low part count. For example, certain features may be integral and unitary with other features to reduce the overall part count. This may further facilitate installation of the upholstery. Also, the system may be manufactured in an efficient manner because there may be fewer parts than systems of the prior art.

FIG. 1 illustrates an example embodiment of a vehicle, which may include an upholstery mounting system according to this disclosure. Various features of the disclosed upholstery mounting system will be discussed according to example embodiments.

As shown in FIG. 1, the vehicle may be a work vehicle 10, such as an agricultural tractor. However, it will be appreciated that the work vehicle 10 may be another type without departing from the scope of the present disclosure (e.g., a crawler dozer, loader, backhoe and skid steer machines used in the construction industry, other machines used in the agriculture and forestry industries, etc.). The upholstery mounting system may be included on objects other than vehicles as well.

Figure 2:
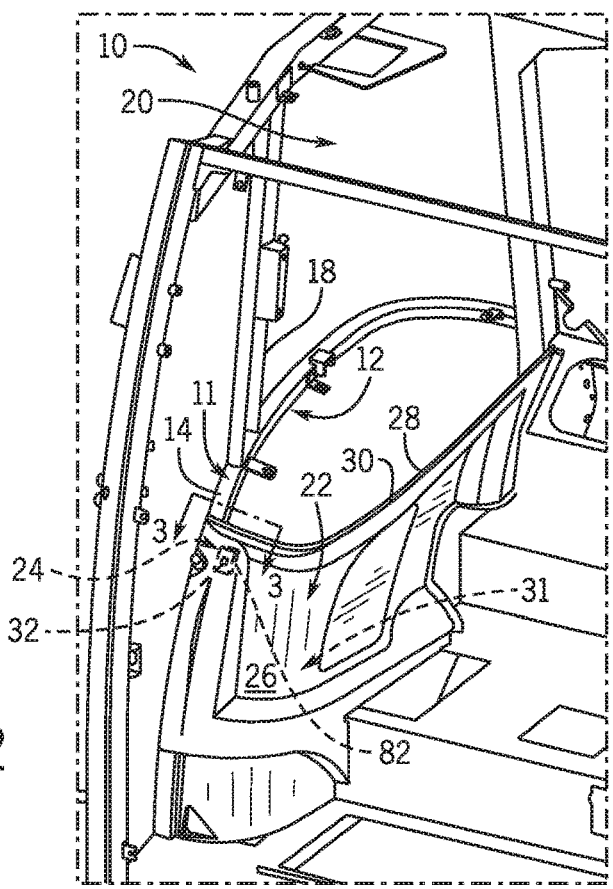
FIG. 2 is a perspective view of a partially assembled operator cabin of the work vehicle of FIG. 1, wherein portions of the upholstery mounting system of the present disclosure is shown in phantom.

As shown in FIGS. 1 and 2, an upholstery mounting system 24 may include a support structure 11 that supports other components of the upholstery mounting system 24. For example, the support structure 11 may include at least part of a vehicle frame 12. The frame 12 may include a plurality of elongate, rigid members that are attached to form a rigid structure. The frame 12 may support a variety of members, such as glass, rigid panels, controls, and the like. However, it will be appreciated that a number of these objects are hidden in FIG. 2 to more clearly show elements of the frame 12. In some embodiments, the frame 12 may include a fender rail 14. The fender rail 14 may be elongate and hollow. The fender rail 14 may be rigid to resist bending. Also, the fender rail 14 may curve, for example, to extend in the circumferential direction partially about a wheel 16 of the work vehicle 10. The frame 12 may also include a cab frame member 18, which extends vertically upward from the fender rail 14. The cab frame member 18 may partly define an operator cabin 20 of the work vehicle 10.

The upholstery mounting system 24 may also include a covering member 22. The covering member 22 may resemble upholstery in that it is generally sheet-like and/or substantially two-dimensional. The covering member 22 may form a seat cover, a wall covering, a ceiling covering, a piece of trim, or other covering inside or outside the work vehicle 10. The covering member 22 may cover over at least part of the frame 12 and/or extend between separated parts of the frame 12. The covering member 22 may include a front surface 26. The covering member 22 may also include an opposing back surface 28. Additionally, the covering member 22 may include a perimeter edge 30. The perimeter edge 30 may define a perimeter of the covering member 22. The covering member 22 may further include a middle portion 31 (FIG. 2) that is surrounded by the perimeter edge 30.

Figure 3:
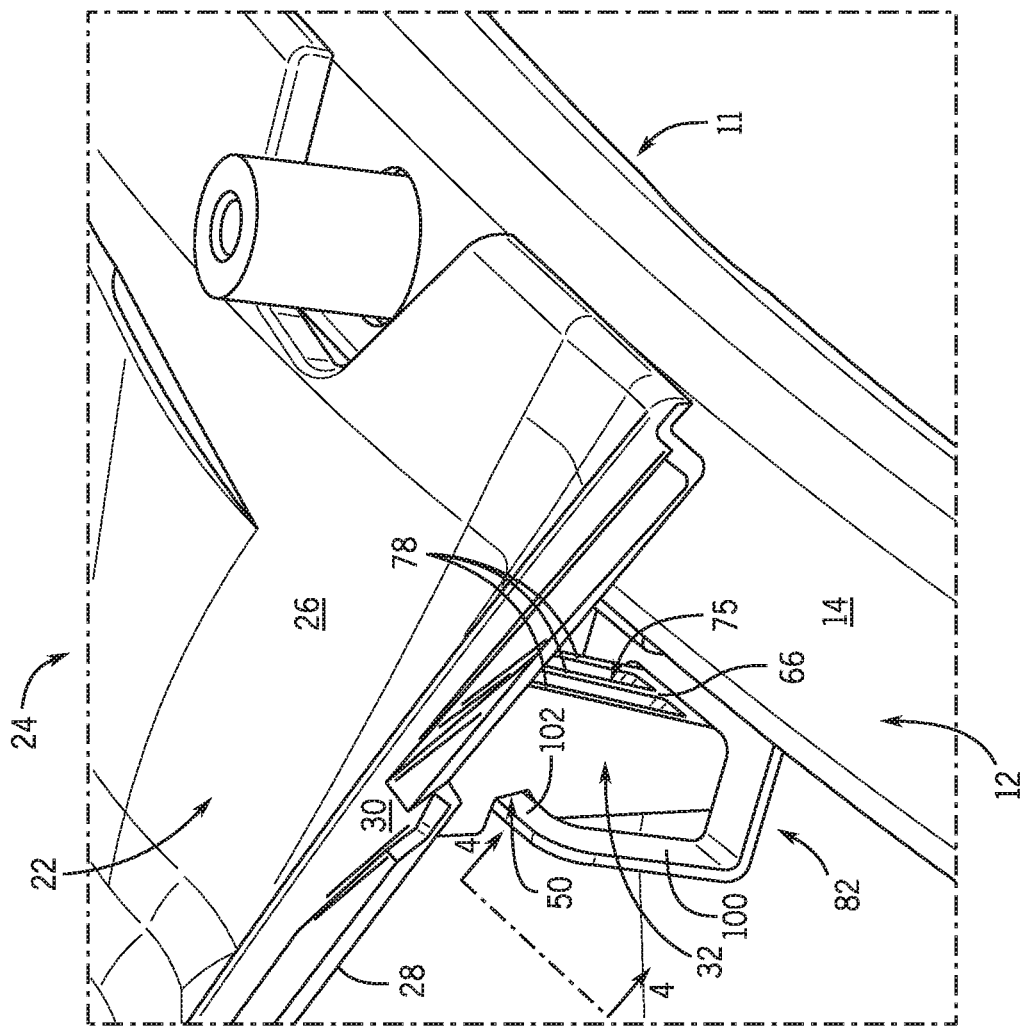
FIG. 3 is an enlarged perspective view taken from the perspective indicated by the line 3-3 of FIG. 2, wherein the upholstery mounting system is shown according to example embodiments of the present disclosure.
Figure 4:
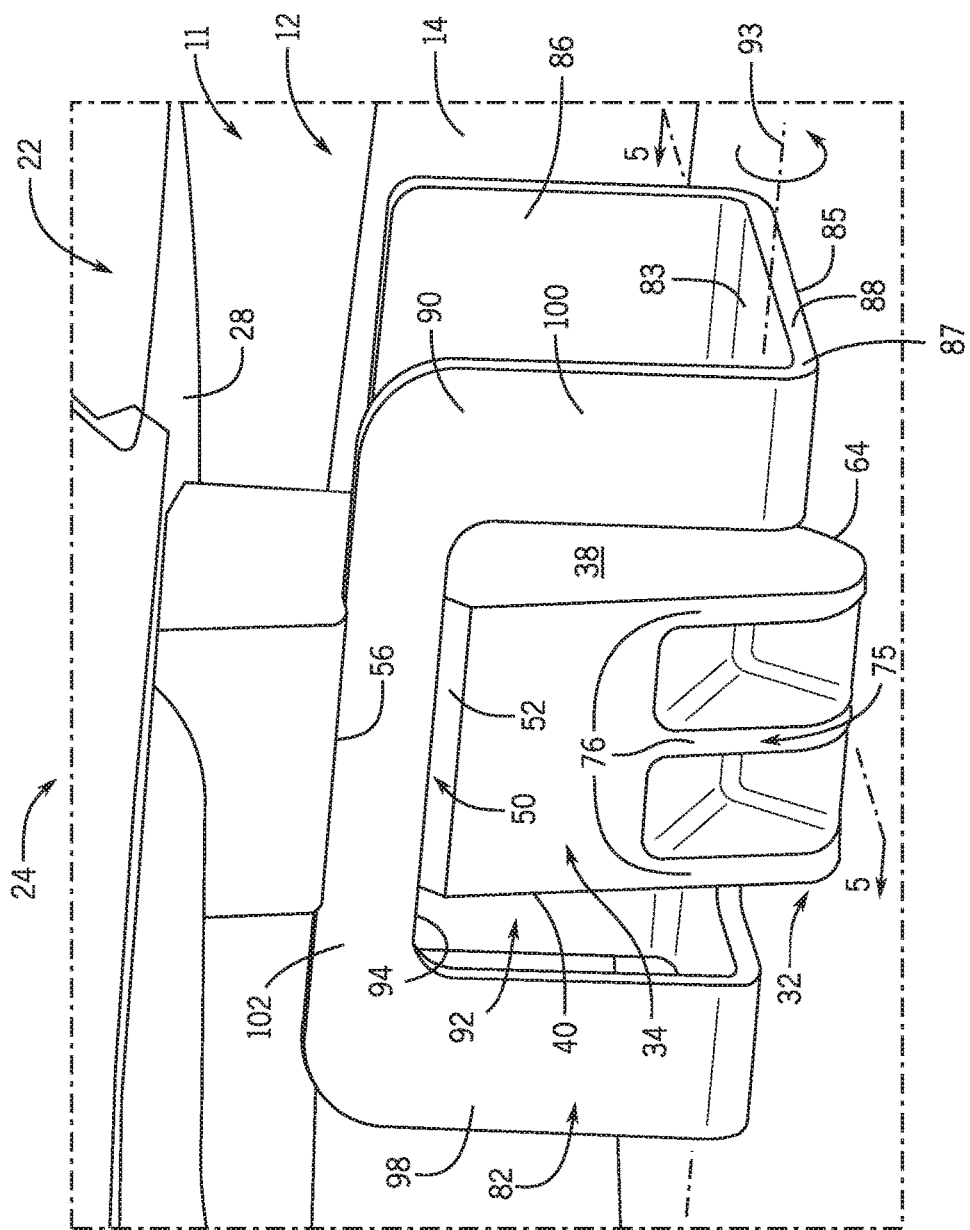
FIG. 4 is a perspective view taken from the perspective indicated by the line 4-4 of FIG. 3.
Figure 5:
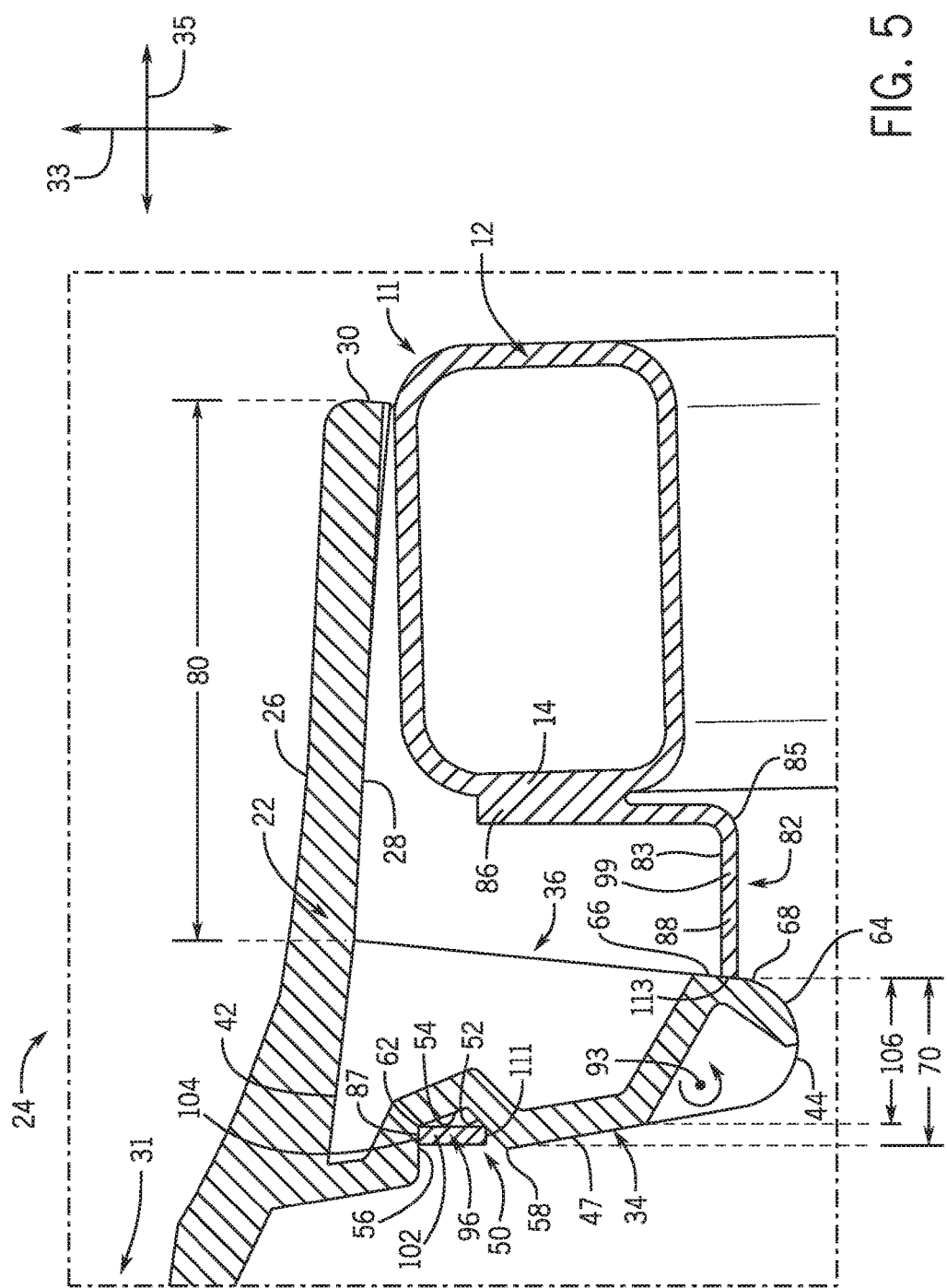
FIG. 5 is a section view taken along the section line 5-5 of FIG. 4.

The upholstery mounting system 24 may additionally include components that interconnect to attach the covering member 22 to the frame 12. For example, in some embodiments, the upholstery mounting system 24 may generally include at least one boss 32 that is attached to the covering member 22. An example embodiment of the boss 32 is shown independently in FIGS. 6A and 6B. The upholstery mounting system 24 may additionally include at least one bracket 82 that is attached to the frame 12. An example embodiment of the bracket 82 is shown independently in FIG. 7. The boss 32 may interconnect with the bracket 82 to attach the covering member 22 to the frame 12 as shown in FIGS. 3-5. In some embodiments, the boss 32 may be removably attached to the bracket 82, meaning that the boss 32 may be detached from the bracket 82 without significant damage to either. The interconnection of the boss 32 to the bracket 82 and the corresponding method of assembly of these components will be discussed in greater detail below.

For purposes of clarity, the mounting system 24 and its various components will be discussed in relation to a Cartesian coordinate system. As indicated, the coordinate system may include a first axis 33, a second axis 35, and a third axis 37. Each of the axes 33, 35, 37 may be perpendicular to each other. The first axis 33 may extend generally in the vertical direction relative to the work vehicle 10. As will become clear, the first axis 33 may also be referred to as an "insertion axis" since this is the axis along which the boss 33 moves toward the bracket 82 during attachment of the covering member 22 to the frame 12. The second axis 35 may extend generally in a cross-vehicle direction relative to the work vehicle 10. The second axis 35 may also extend in an inboard and outboard direction toward and away from the sides of the work vehicle 10. The third axis 37 may extend generally in a fore-aft direction relative to the work vehicle 10. In other words, the third axis 37 may extend between the front end of the work vehicle 10 and the rear end of the work vehicle 10.

Embodiments of the boss 32 will now be discussed with reference to FIGS. 6A and 6B. The boss 32 may be substantially wedge-shaped and may generally include a first face 34 and an opposing second face 36. The boss 32 may also include a first side 38, which extends transversely between both first and second faces 34, 36. The boss may further include a second side 40, which is opposite the first side 38. Additionally, the boss 32 may include an attached end 42, which may be attached to the covering member 22. The boss 32 may project from the back surface 28 over the covering member 22, and the boss may terminate at a free end 44.

The boss 32 may be a solid body (i.e., not hollow). The first side 38 and the second side 40 may each be substantially planar and disposed substantially parallel to the first axis 33. The first face 34 and the second face 36 may be disposed at an angle relative to the first axis 33. Additionally, the first face 34 may be disposed at an acute angle 46 (FIG. 6B) relative to the second face 36 to provide the boss 32 with its wedge-like shape. As such, the free end 44 may be narrower than the attached end 42 of the boss 32.

The first face 34 and the second face 36 may also be non-planar, may include curved surfaces (concave and/or convex curved surfaces), projections, or other surface variations. For example, the boss 32 may include one or more ribs 75 on the first face 34 and/or the second face 36. In the embodiment shown, for example, the first face 34 includes inner ribs 76 and the second face 36 includes outer ribs 78. The longitudinal axis of the ribs 76, 78 may be straight. The ribs 76, 78 may be proximate the free end 44 and may extend upward, generally along the first axis 33. The ribs 76, 78 may be included to increase rigidity so that the boss 32 resists bending and/or deformation. The ribs 76, 78 may also be included to reduce weight and/or the amount of material used in making the boss. Furthermore, the ribs 76, 78 may allow the boss 32 to cure effectively in cases in which the boss 32 is injection molded.

As shown in FIGS. 5, 6A, and 6B, the first face 34 may face inward, primarily along the second axis 35. Thus, the first face 34 may face inboard toward the middle portion 31 of the covering member 22 and away from the perimeter edge 30 (FIG. 5). The second face 36 may face outward, primarily along the second axis 35. Thus, the second face 36 may face outboard away from the middle portion 31 of the covering member 22 and toward the perimeter edge 30 (FIG. 5).

Furthermore, the first face 34 and/or the second face 36 may include features that are configured for interconnecting the boss 32 to the bracket 82 of the frame 12. These features of the first and second faces 34, 36 will now be discussed in detail according to example embodiments.

The first face 34 may include an inside lead-in surface 47. The inside lead-in surface 47 may extend from the free end 44 and generally upward toward the attached end 42. The inner ribs 76 may extend partly along the inside lead-in surface 47, proximate the free end 44. Also, as shown in FIG. 6B, pockets 77 may be defined between the inner ribs 76. The inside lead-in surface 47 may also include a planar portion 48 that is disposed above the inner ribs 76. As shown in FIG. 6B, the planar portion 48 may be substantially flush with the outer surface of the ribs 76. The planar portion 48 may terminate at a ridge 58.

The first face 34 may also include a recess 50. The recess 50 may be defined by a lower surface 52, an upper surface 54, and a stop surface 56. Each of the surfaces 52, 54, 56 may be planar and may extend along the third axis 37, continuously between the first and second sides 38, 40 of the boss 32.

As shown in FIGS. 6A and 6B, the lower surface 52 may extend from the ridge 58 to a first inside edge 60. The upper surface 54 may extend from the first inside edge 60 and may meet the stop surface 56 at the second inside edge 62. The ridge 58, the first inside edge 60, and the second inside edge 62 may extend substantially straight, along the third axis 37.

The second face 36 of the boss 32 may include an outside lead-in surface 64. In some embodiments, the outside lead-in surface 64 may be disposed proximate the free end 44 of the boss 32 and may extend upward therefrom. The outside lead-in surface 64 may be rounded, substantially about the third axis 37 as shown in FIG. 6B. The outside lead-in surface 64 may terminate at an outside ridge 68.

Above the outside lead-in surface 64, the second face 36 may include an outside retaining surface 66. The outside retaining surface 66 may be planar in some embodiments. The outside retaining surface 66 may extend upward from the outside ridge 68, substantially along the first axis 33.

The boss 32 may have a width 70 (FIG. 6B), measured along the second axis 35 between the outside ridge 68 and the ridge 58. The boss 32 may also have a length 72 (FIG. 6A), measured along the third axis 37 between the first side 38 and the second side 40. Furthermore, the boss 32 may have a height 74 (FIG. 6B), measured along the first axis 33 from the back surface 28 of the covering member 22 to the free end 44 of the boss 32. As shown in FIG. 6B, the outside lead-in surface 64 may be spaced apart at a distance 67 along the first axis 33 from the planar portion 48 of the inside lead-in surface 47. Also, the outside retaining surface 66 may be spaced apart at a distance 69 along the first axis 33 from the recess 50.

The boss 32 may be attached to the covering member 22 in any location and in any suitable fashion. For example, in some embodiments, the boss 32 may be attached to and may project from the back surface 28 of the covering member 22. Also, the boss 32 may be spaced inward from the perimeter edge 30 at a distance 80 (FIG. 5). In some embodiments, the boss 32 and the covering member 22 may be integrally attached such that the boss 32 and the covering member 22 are unitary (i.e., one-piece). Thus, the boss 32 and the covering member 22 may be formed together via an injection molding process. In other embodiments, the boss 32 may be adhesively attached to the covering member 22. In still other embodiments, the boss 32 may be attached to the covering member 22 via fasteners.

Referring now to FIGS. 5 and 7, embodiments of the bracket 82 will be discussed. As mentioned, the bracket 82 may be fixed to the frame 12 and may interconnect with the boss 32 for attaching the covering member 22 to the frame 12. Accordingly, the bracket 82 may include various features that correspond with those of the boss 32 for interconnecting to the boss 32 and for facilitating the same.

The bracket 82 may be a sheet of bent material, such as sheet metal. The bracket 82 may include an upper, first surface 83. The bracket 82 may also include a lower, second surface 85 that opposes the first surface 83. Furthermore, the bracket 82 may include an outer periphery 87 or outer peripheral edge.

The bracket 82 may be bent to have a generally U-shaped cross section (taken along the plane defined by the first and second axes 33, 35). This U-shaped cross section may be defined by a mounting portion 86, a first portion 88, and a second portion 90 of the bracket 82. These portions 86, 88, 90 may be planar in some embodiments. In some embodiments, the mounting portion 86 may extend downward along the first axis 33, the first portion 88 may extend inwardly and transverse to the mounting portion 86 along the second axis 35. The second portion 90 may extend upwardly and transverse to the first portion 88 along the first axis 33. The second portion 90 and the first portion 88 may also meet at a bend 91. Accordingly, the second portion 90 may be parallel to and spaced apart from the mounting portion 86 with the first portion 88 extending perpendicularly between the mounting portion 86 and the second portion 90. The bracket 82 may have a substantially constant thickness 84 (measured between the first surface 83 and the second surface 85) through, at least, the first portion 88 and the second portion 90.

The bracket 82 may further include an opening 92. The opening 92 may extend through both the first surface 83 and the second surface 85 of the bracket 82. The opening 92 may also be defined by an inner edge 94 (i.e., the rim of the opening 92). In some embodiments, the opening 92 may be defined in the first portion 88 and the second portion 90. As such, the opening 92 may define a brace 96 of the bracket 82. The brace 96 may be elongate and bar-shaped. The brace 96 may also form part of the first portion 88 and the second portion 90 of the bracket 82. In some embodiments, the brace 96 may be subdivided into a first arm 98, a second arm 100, and a cross bar 102. The first arm 98 may extend away from a base portion 99 of the bracket 82 and bend upward at the bend 91. The second arm 100 may extend away from an opposite side of the base portion 99 and bend upward at the bend 91. The cross bar 102 may extend between the first and second arms 98, 100. The cross bar 102 may also be defined by an outer portion 104 of the periphery 87 of the bracket 82 and by a first portion 111 of the inner edge 94 of the opening 92. As such, the cross bar 102 may be spaced apart from the brace 96. In other words, the cross bar 102 may be disposed on opposite sides of the opening 92.

Figure 8B:
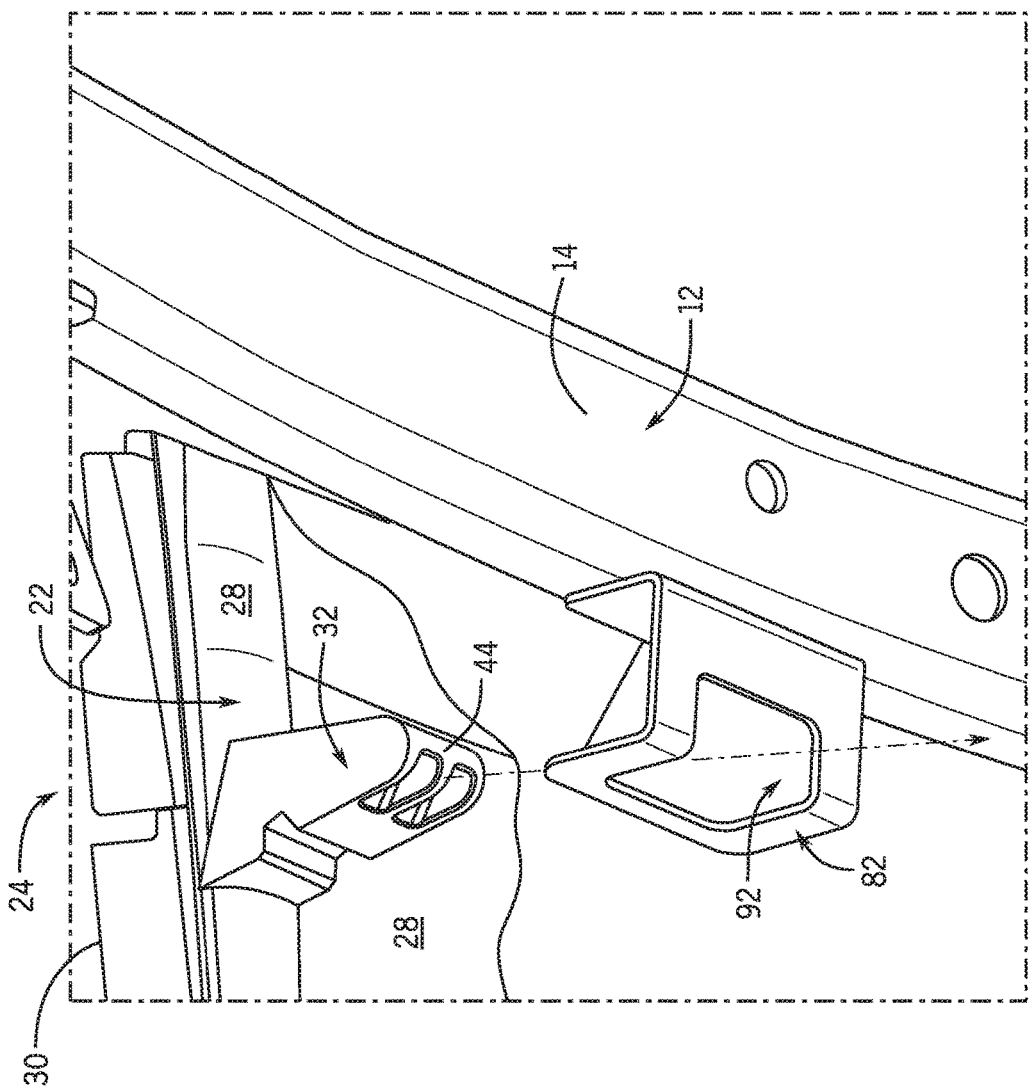
FIG. 8B is a perspective view of the upholstery mounting system, wherein the boss is detached and shown moving toward the bracket.
Figure 8C:
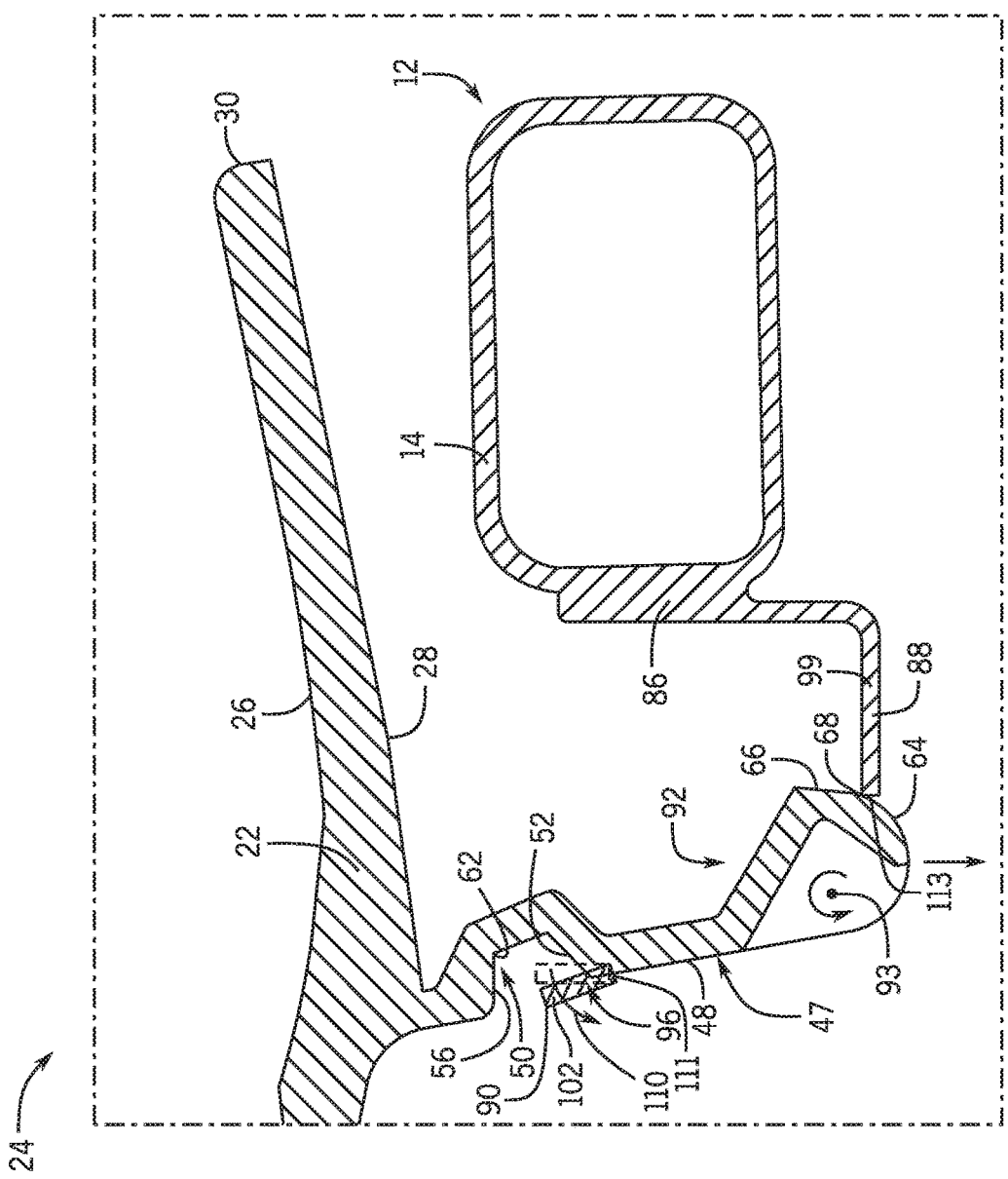
FIG. 8C is a section view of the upholstery mounting system, wherein the boss is shown abutting and flexing open the bracket during insertion of the boss into the bracket.
Figure 8D:
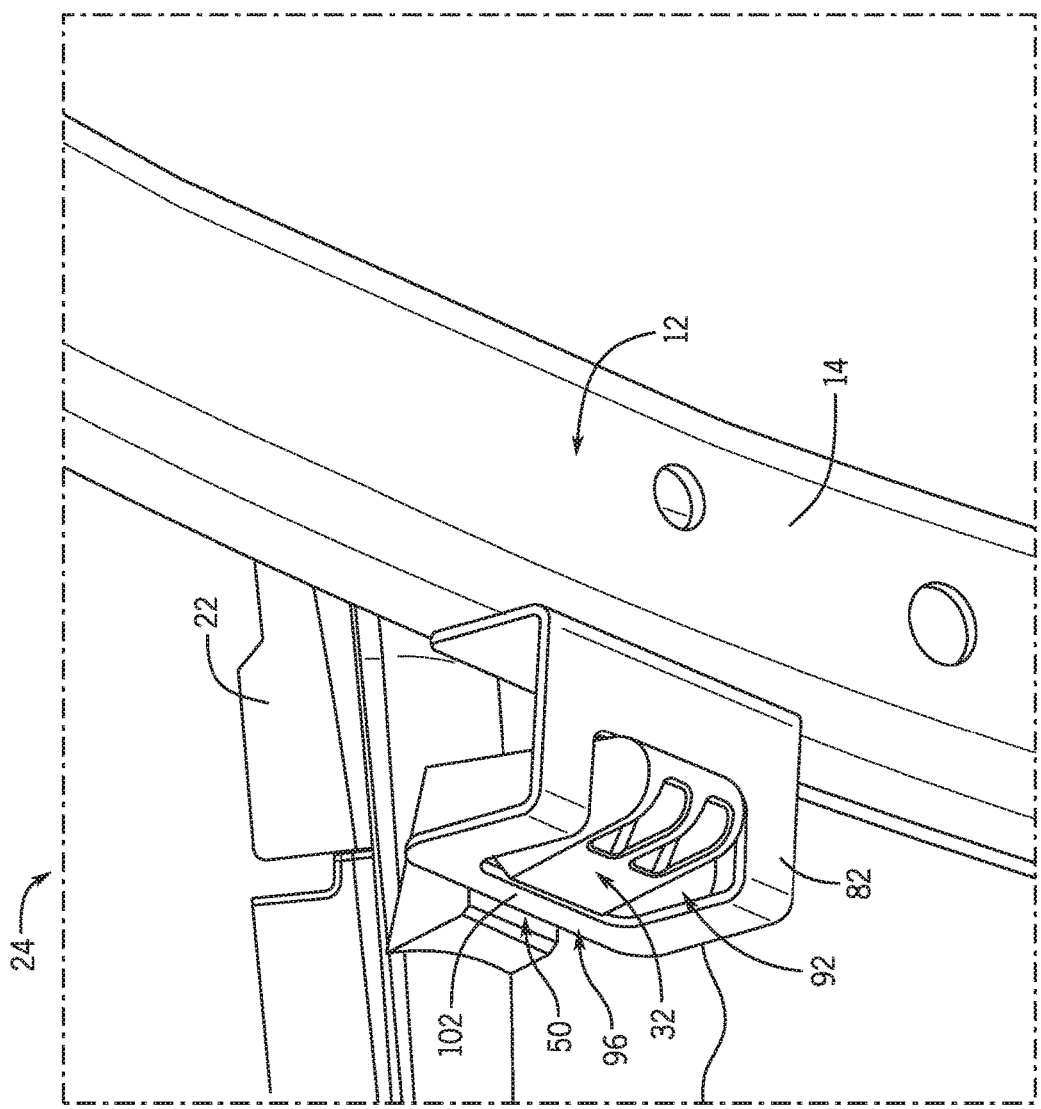
FIG. 8D is a perspective view of the upholstery mounting system, wherein the boss is attached to the bracket according to example embodiments of the present disclosure.

The bracket 82 may be somewhat flexible, but the flexibility may be limited (e.g., the bracket 82 may flex under considerable force). In some embodiments, the bracket 82 may flex under a manually-generated force (i.e., force generated by hand). The bracket 82 may define a flexure axis 93 about which the bracket 82 bends resiliently. In some embodiments, the flexure axis 93 may be disposed proximate the bend 91. Also, the flexure axis 93 may extend substantially parallel to the third axis 37. As will be discussed, the second portion 90 may flex outward about the flexure axis 93 relative to the first portion 88. This flexure of the bracket 82 is illustrated in FIG. 8C, wherein an unflexed, neutral position of the cross bar 102 is shown in phantom and a flexed position of the cross bar 102 is shown in solid lines. Flexure is indicated by arrow 110 in FIG. 8C. This flexure may occur about the axis 93. The resilience and elasticity of the bracket 82 may bias the cross bar 102 back toward the unflexed, neutral position once the bending force is reduced. This flexure will be discussed in greater detail below.

The bracket 82 may have various dimensions that are configured according to corresponding dimensions of the boss 32. For example, the bracket 82 may have a distance 112, measured along the first axis 33 between the first portion 88 of the bracket 82 and the cross-bar 102. The distance 112 may be substantially equal to the distance 69 between the outside retaining surface 66 and the recess 50 of the boss 32. Additionally, the distance 112 may be substantially equal to the distance 67 between the outside lead-in surface 64 and the planar portion 48 of the inside lead-in surface 47. Also, the width 106 of the opening 92 may be less than the width 70 of the boss 32. Because the width 106 is less than the width 70, the boss 32 may be wedged and retained within the opening 92 and may flex open the bracket 82 when inserting the boss 32 into the bracket 82. Also, a length 103 of the opening 92 may be greater than the length 72 of the boss 32. In some embodiments, the length 103 of the opening 92 may be at least 1.2 times greater than the length 72 of the boss 32. As such, there may be a relatively large amount of clearance between the first and second sides 38, 40 of the boss 32 and a lateral portion 115 of the inner edge 94 of the opening 92. This clearance may allow for the upholstery mounting system 24 to have relatively loose manufacturing tolerances for added convenience and increased manufacturing efficiency.

The bracket 82 may be attached to the frame 12 in any suitable location and in any suitable fashion. In some embodiments, the mounting portion 86 may be fixedly attached to the frame 12. For example, the second surface 85 may extend tangent to the frame 12. The mounting portion 86 may be integrally attached to the frame 12 in some embodiments so as to be unitary (i.e., one-piece) with the frame 12. Specifically, in some embodiments, the bracket 82 is welded to the frame 12. In other embodiments, the bracket 82 is attached via fasteners and/or adhesives.

Attachment of the boss 32 to the bracket 82 will now be discussed with reference to FIGS. 8A-8D. The boss 32 is shown detached from the bracket 82 (i.e., in a detached position) in FIGS. 8A and 8B. The boss 32 may be moved along the first axis 33 downward, and received partially within the opening 92 of the bracket 82 as shown in FIG. 8C. This position may be referred to as an "abutting position" or an "intermediate position". As shown, the planar portion 48 of the inside lead-in surface 47 of the boss 32 may abut the cross bar 102 of the bracket 82. Meanwhile, in this position, the outside lead-in surface 64 may abut a second portion 113 of the inner edge 94 of the opening 92, proximate the base portion 99 of the bracket 82. Further downward movement of the boss 32 along the first axis 33 may cause the planar portion 48 of the inside lead-in surface 47 to push against the cross bar 102 and the outside lead-in surface 64 to push against the base portion 99 to push open, flex, and rotate the second portion 90 away from the first portion 88 about the flexure axis 93. This may increase the width of the bracket 82 and is represented by arrow 110 in FIG. 8C. Accordingly, the boss 32 may flex open the bracket 82 such that the bracket 82 allows passage of the boss 32 further into the opening 92.

Further downward movement of the boss 32 along the first axis 33 may cause the cross bar 102 to eventually enter the recess 50. This "attached position" is shown in FIG. 5. Specifically, the second portion 90 of the bracket 82 may bias back toward its neutral position, causing the cross bar 102 to bias into the recess 50. The cross bar 102 may be wedged inside the recess 50 such that the outer portion 104 contacts the second inside edge 62 and the first portion 111 of the inner edge 94 abuts the lower surface 52 of the recess 50. At the same time, the outside retaining surface 66 of the boss 32 may abut and push against the second portion 113 of the inner edge 94, proximate the base portion 99 of the bracket 82. In this "attached position," the internal surface(s) of the recess 50 and the outside retaining surface 66 may continue to flex the cross bar 102 away from the base 99 such that the bracket 82 is still biased toward its neutral position to further grip and retain the boss 32. With the boss 32 attached, the covering member 22 may be attached to and cover the frame 12. As shown in FIG. 5, portions of the back surface 28 of the covering member 22, proximate the perimeter edge 30 may lie over the frame 12 to cover the same.

When the boss 32 and bracket 82 are interconnected, the covering member 22 may be firmly and securely fixed to the frame 12. If necessary (e.g., when re-upholstering), the user may disconnect the boss 32 from the bracket 82 by manually flexing the second portion 90 of the bracket about the flexure axis 93. This may allow the boss 32 passage to move upward and away from the bracket 82 along the first axis 33.

In summary, the upholstery mounting system 24 provides a secure and convenient way of connecting the covering member 22 (i.e., upholstery) to the frame 12 or other support structure 11. The bracket 82 may also be flexible and resilient, which may pull the covering member 22 taut when attached to the frame 12. Also, the flexibility of the bracket 82 may facilitate attachment of the boss 32 because some portions may be biased toward an attached position (e.g., the cross bar 102 may be biased into the recess 50). Furthermore, the flexibility of the bracket 82 may allow for greater manufacturing variations between the parts and effectively allow for relatively loose manufacturing tolerances. Despite these variations, the boss 32 will still be able to connect to the bracket 82 because the bracket 82 may flex to accommodate passage of the boss 32. Additionally, the upholstery mounting system 24 may be substantially hidden from view when the covering member 22 is attached to the frame 12. Specifically, the covering member 22 may cover over the boss 32 and the bracket 82 such that the upholstery mounting system 24 is inconspicuous.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An upholstery mounting system, comprising:
    a support structure;
    a covering member;
    a bracket that is fixed to the support structure, the bracket including surfaces defining a first portion and a second portion extending perpendicularly relative to the first portion, when in a first position, the first portion and the second portion both together in part defining a channel and both together defining a bounded opening that extends through the surfaces from the channel and has an inner edge defined by the first portion and the second portion such that the inner edge of the opening, and thereby the opening, includes portions that extend perpendicularly relative to one another in the first position, the bracket being flexible to move the first portion of the bracket relative to the second portion of the bracket between the first position and a second position relative to the support structure; and
    a boss that is fixed to the covering member, the boss having a first face and a second face that opposes the first face and having a detached position and an attached position relative to the bracket;
    wherein the boss, in the detached position, is outside the opening;
    wherein the boss, in the attached position, is received in the channel and the opening and removably attached to the bracket to attach the covering member to the support structure with the covering member extending over and covering at least part of the support structure;
    wherein the boss, in the attached position, is received in the channel and the opening with the first face abutting the first portion of the bracket at the inner edge of the opening and the second face abutting the second portion of the bracket at the inner edge of the opening to retain the boss in the attached position relative to the bracket; and
    wherein the boss is configured to flex the bracket between the first position and the second position as the boss moves from the detached position to the attached position.

2. The upholstery mounting system of claim 1, wherein the boss is integrally attached to the covering member such that the covering member and the boss are unitary.

3. The upholstery mounting system of claim 1, wherein the covering member includes a front surface, a back surface that opposes the front surface, and a perimeter edge; and
    wherein the boss projects from the back surface of the covering member, spaced inward from the perimeter edge at a distance.

4. The upholstery mounting system of claim 1, wherein the first portion extends away from the support structure and the second portion is spaced away from the support structure.

5. The upholstery mounting system of claim 4, wherein the bracket has a substantially U-shaped cross section, the U-shaped cross section defined by the first portion, the second portion, and a mount portion of the bracket; and
    wherein the mount portion is fixed to the support structure.

6. The upholstery mounting system of claim 4, wherein the bracket has a substantially constant thickness through both the first portion and the second portion.

7. The upholstery mounting system of claim 4, wherein the bracket has a flexure axis about which the second portion is configured to rotate relative to the first portion when the second portion flexes between the first position and the second position.

8. The upholstery assembly of claim 1, wherein the first face includes a recess; and
    wherein the boss, in the attached position, is received in the opening of the bracket with the first portion of the bracket, at least in part, received within the recess.

9. The upholstery mounting system of claim 8, wherein the second face includes a retaining surface; and
    wherein the boss, in the attached position, is received in the opening of the bracket with the retaining surface abutting an edge of the opening to retain the second portion of the bracket within the recess.

10. The upholstery mounting system of claim 1, wherein the first face includes a first lead-in surface and the second face includes a second lead-in surface;
   wherein the boss is movable to an abutting position relative to the bracket and the boss is configured to be in the abutting position as the boss moves from the detached position to the attached position; and
   wherein the boss, in the abutting position, is configured such that the first lead-in surface pushes against the first portion of the bracket and the second lead-in surface pushes against the second portion of the bracket to allow passage of the boss to the attached position.

11. The upholstery mounting system of claim 1, wherein the first face and the second face are disposed at an acute angle relative to each other.

12. The upholstery mounting system of claim 1, wherein the bracket is welded to the support structure.

13. An upholstery mounting system, comprising:
   a support structure;
   a covering member;
   a bracket that is fixed to the support structure, the bracket including surfaces defining a first portion and a second portion both together in part defining a channel and both together defining an opening that extends through the surfaces from the channel, the bracket being flexible to move between a first position and a second position relative to the support structure; and
   a boss that is fixed to the covering member, the boss having a first face and a second face that opposes the first face and having a detached position and an attached position relative to the bracket;
   wherein the boss, in the detached position, is outside the opening;
   wherein the boss, in the attached position, is received in the channel and the opening and removably attached to the bracket to attach the covering member to the support structure with the covering member extending over and covering at least part of the support structure;
   wherein the boss, in the attached position, is received in the channel and the opening with the first face abutting the first portion of the bracket at the opening and the second face abutting the second portion of the bracket at the opening to retain the boss in the attached position relative to the bracket;
   wherein the boss is configured to flex the bracket between the first position and the second position as the boss moves from the detached position to the attached position;
   wherein the bracket defines a first axis, a second axis, and a third axis that are orthogonal to each other;
   wherein the boss is configured to move substantially along the first axis when moving between the detached position and the attached position;
   wherein the first portion of the bracket extends from the support structure substantially along the second axis;
   wherein the second portion of the bracket extends from the first portion substantially along the first axis;
   wherein the opening has a first length measured along the third axis;
   wherein the boss has a second length measured along the third axis; and
   wherein the first length is greater than the second length.

14. An upholstery mounting system, comprising:
   a support structure;
   a covering member;
   a bracket that is fixed to the support structure, the bracket including surfaces defining a first portion and a second portion extending perpendicularly relative to the first portion, when in a first position, the first portion and the second portion both together in part defining a channel and both together defining a bounded opening that extends through the surfaces from the channel and has an inner edge defined by the first portion and the second portion such that the inner edge of the opening, and thereby the opening, includes portions that extend perpendicularly relative to one another in the first position, the bracket being flexible to move the first portion of the bracket relative to the second portion of the bracket between the first position and a second position relative to the support structure; and
   a boss that is fixed to the covering member, the boss having a first face and a second face that opposes the first face, the boss having a detached position and an attached position relative to the bracket;
   wherein the boss, in the detached position, is outside the opening and spaced apart from the bracket;
   wherein the boss, in the attached position, is received in the channel and the opening and removably attached to the bracket to attach the covering member to the support structure with the covering member extending over and covering at least part of the support structure; and
   wherein the first face abuts the first portion of the bracket at the inner edge of the opening and the second face abuts the second portion of the bracket at the inner edge of the opening and resiliently flexes the first portion relative to the second portion as the boss moves from the detached position to the attached position.

15. The upholstery mounting system of claim 14, wherein the first face of the boss includes a recess with an internal surface; and
   wherein the first portion of the bracket, at least in part, is received within the recess and abuts the internal surface of the recess when the boss is in the attached position.

16. The upholstery mounting system of claim 15, wherein second face of the boss includes a planar retaining surface; and
   wherein the second portion of the bracket includes an inner edge of the opening that abuts against the planar retaining surface when the boss is in the attached position.

17. The upholstery mounting system of claim 16, wherein the first face of the boss includes an inside lead-in surface and the second face of the boss includes an outside lead-in surface; and
   wherein the inside lead-in surface abuts the second portion of the bracket and the outside lead-in surface abuts the first portion of the bracket to flex open the bracket while the boss moves from the detached position to the attached position.

18. The upholstery mounting system of claim 14, wherein the first portion extends away from the support structure and the second portion is spaced away from the support structure; and wherein the bracket has a flexure axis about which the second portion is configured to rotate relative to the first portion as the boss moves from the detached position to the attached position.

19. The upholstery mounting system of claim 14, wherein the bracket is integrally attached to the support structure so as to be unitary; and
   wherein the boss is integrally attached to the covering member so as to be unitary.

* * * * *